3,623,368
TURBINE ENGINE BLADE PYROMETER
John A. Decker, Jr., Concord, Mass., assignor to
Comstock & Wescott, Inc., Cambridge, Mass.
Filed Mar. 9, 1970, Ser. No. 17,806
Int. Cl. F02c 7/00; G01j 5/08; G01k 1/12, 13/08
U.S. Cl. 73—343 R
12 Claims

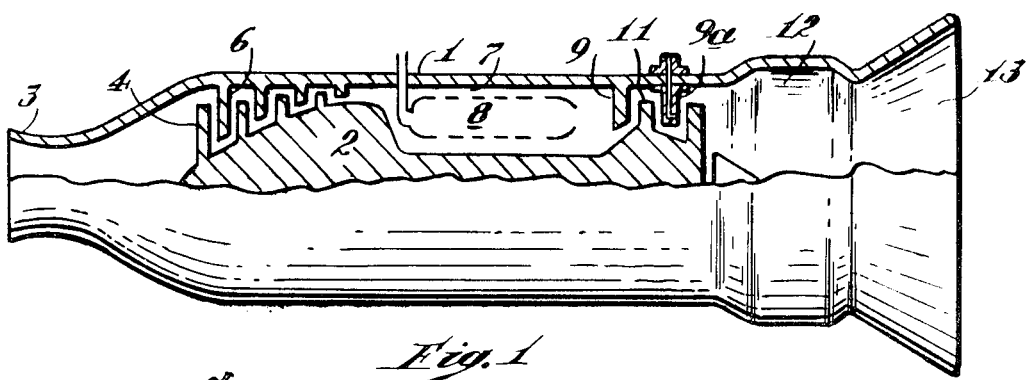
Fig. 1
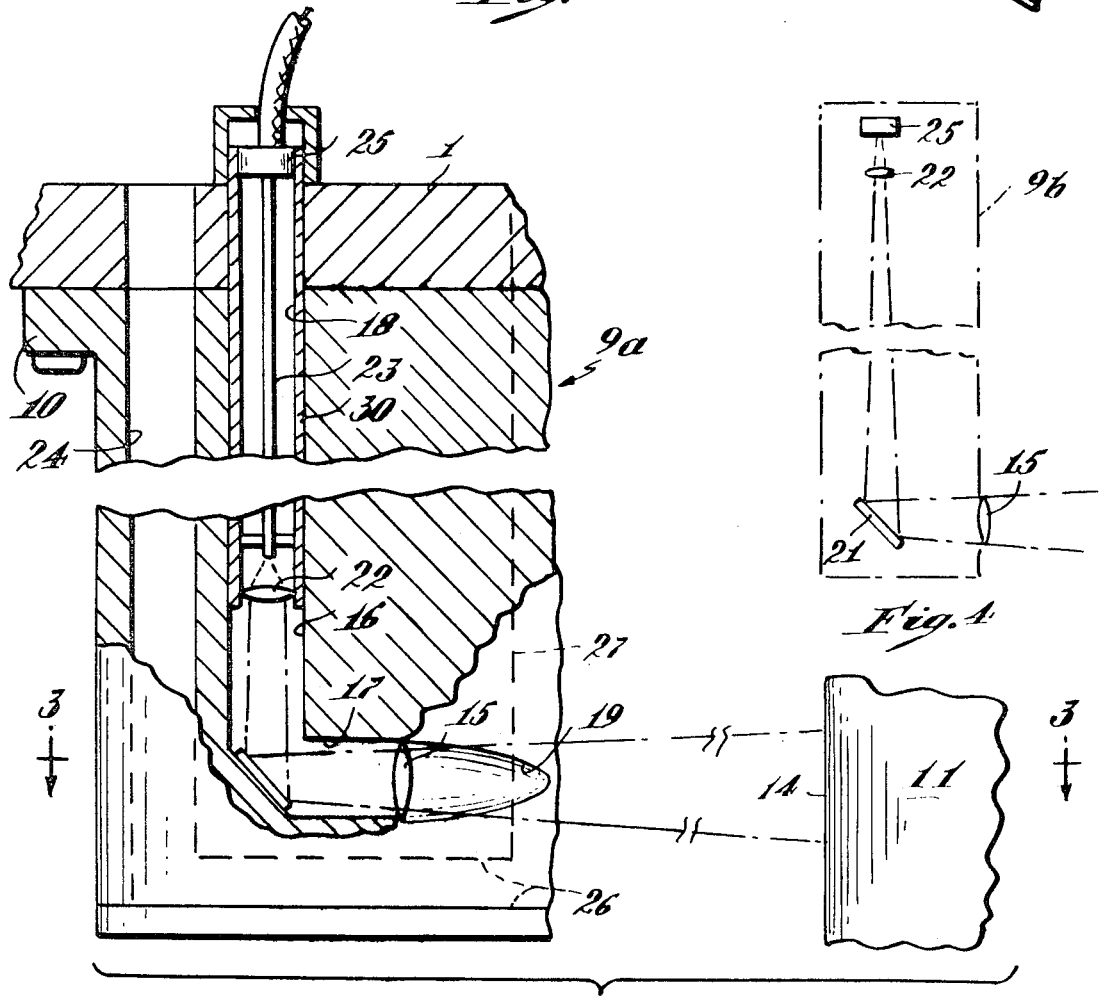
Fig. 2
Fig. 4
Fig. 3

ABSTRACT OF THE DISCLOSURE

In a jet turbine engine an optical passage extends through the stator blade first radially inwardly from the outer turbine wall, thence laterally toward the adjacent path of the moving rotor blades whose surface temperature is to be measured. In the end passage are a sapphire objective lens viewing and rceiving infrared from the rotor blade. At the focus of the objective lens is a quartz field lens for focusing the infrared energy on an infrared photodetector within the turbine or a quartz optical fibre leading to a photodetector outside the turbine. As the rotor blades pass the objective lens the photodetector produces a series of electrical pulses whose amplitudes are proportional to the blade temperatures. The pulses are sorted, measured and the temperature of each blade is registered to allow the detection of an individual overheated blade.

In the development of jet turbine engines for aircraft there has been a long-standing need to monitor the temperature of the rotating turbine blades at the leading edge of the blades, that is, the nearest blade edge downstream from the combustion chamber and subject to failure in hot gas temperatures in the order of 2500° F. while turning at speeds of 8000 r.p.m.

Prior attempts have been made to measure blade temperatures with optical pyrometers viewing the blade at an angle from outside the turbine. Both the angle and large varying masses of intervening hot gases contribute to unreliability or complexity of the measureemnt. Random, unwanted reflections or emissions from other internal parts of the turbine make it difficult to determine exactly what energy source the pyrometer is detecting. Non-optical pyrometers such as thermocouple devices may be mounted within the hot gas stream, but are far too slow in response to sense the temperature of blades moving thereby at 8000 r.p.m.

According to the present invention apparatus for measuring the surface temperature of a moving blade within a turbine wall comprises a body fixed to the turbine wall and extending inwardly of wall adjacent the path of the rotor blade, said body having light passage means extending inwardly in said body to an exit out of said body opposite the path of the rotor blade, and an infrared photoreceptor in said body inside said turbine wall and lens means for viewing said rotor blade through said exit and for directing infrared energy from the blade on said photoreceptor, said body having internal fluid channeling means adjacent said passage means, said channeling means being adapted to conduct a fluid coolant past said lens means during higah temperature operation of said turbine.

For the purpose of illustration typical embodiments of the invention are shown in the accompanying drawing in which;

FIG. 1 is a side elevation of a jet turbine engine partly broken away to show the turbine stator and rotor blades;

FIG. 2 is an enlarged elevation of a stator and rotor blade shown partly in section;

FIG. 3 is a section on line 3—3 of FIG. 2; and

FIG. 4 is an optical diagram.

A typical jet turbine engine, as shown in FIG. 1, comprises an outer wall 1 forming the turbine housing around a rotor 2 journaled in the housing. Air enters an intake 3 and is compressed by blades 4 and 6 on rotor and housing respectively and fed to a combustion chamber 7 where heat from fuel burning in perforate combustors 8 raises the gas temperature to 2500° F., for example. The hot gas stream continues to and expands in the turbine proper comprising one or more sets of stator blades 9 and blades 11 on the rotor 2 which drives the compressor blades 4 at thosuands of r.p.m. The gas may be further heated in an afterburner 12 and further expands to propulsion velocity in the jet nozzle 13.

Because the rotor blades 11, in addition to being heated to surface temperatures of 1500°–2000° F. are also subject to the stress of rotation it is highly desirable to make a continuous measurement of the temperature, both in testing and in flight operation. As shown in FIGS. 2 and 3, a temperature measurement of the upstream surface 14 of the rotor blades 11 is made by an infrared pyrometer system in a modified stator blade 9a secured to the turbine housing 1 at flanges 10. Within the stator 9a are two light passages 16 and 17 connecting at right angles. The first passage 16 connects with an opening 18 through the turbine wall 1, and extends radially inwardly of the turbine. The second passage 17 extends from its connection with the first passage 16 to an exit opening 19 in the downstream surface of the stator blade, the second passage being directed toward the path of the upstream surface 14 of the rotor blade 11.

A sapphire objective lens 15 at the exit 19 views the surface 14 of the rotor blade 11. Slightly recessed in a passage 17 of 0.210 inch diameter an objective lens with an aperture ratio of $f/12.5$ will effectively view a rotor surface of approximately 0.25 square centimeter at a distance of about two inches. The infrared image received by the objective lens 15 from the blade 11 is reflected by a first surface, 45° metallic mirror 21 to a quartz field lens 22 located at the focal plane of the objective lens. The field lens 22 focuses the infrared energy on the entrance aperture of a quartz fibre or fibre group 23 or like photoreceptor mounted with the field lens on a sleeve 30. The fibre 23 transmits the energy to a very fast infrared photodetector 25, such as a silicon avalanche photodiode, for example, Texas Instruments type TIXL55 or E.G. & G. type AV–102. Such photodiodes have a response time of the order of 3 nanoseconds with peak responses in the 0.7 to 0.9 micron wavelength range of infrared radiation, and thus are capable of sensing rotor blades individually in the short interval of their pass through the field of view of the objective lens, e.g., one blade each 60 microseconds for a typical 125-blade turbine rotation at 8000 r.p.m.

The passages in which the objective and field lenses and miror are mounted are disposed closely adjacent fluid cooling channels in the body of the stator blades. By way of example, water or air is supplied through the turbine wall to a channel 24 leading radially inwardly of the stator between the light passage and the upstream edge of the stator blade, thence through a channel portion 26 between light passage 17 and the end of the blade, and out a radial channel portion 27. If bleed air taken from the compressor, typically at 300° to 600° F., is used to reduce the internal blade temperature below its several thousand degree surface temperature, the sapphire or quartz lenses are protected against thermal fracture. Equally importantly the optical elements, i.e. lenses 15 and 22 and the mirror 21 are protected against significant absorbtion or reradiation of extraneous infrared energy to the photocell which would cause spurious responses. The photodiode, having a maximum temperature tolerance of about 250° F., is mounted outside the blade, beyond the turbine wall 1, as shown in FIG. 2, or the quartz fibre 23 may be extended to a more remote location of the photodiode 25. If the cooling fluid is water below 212° F., the photodiode 25 may be located within a stator blade 9b or like body, as shown in FIG. 4, in which case the photodiode 25 or its integral immersion lens constitutes the photoreceptor at the focus of the field lens 22.

The photodiode 25 responds to the energy from each rotor blade by generating at each blade pass a short electrical pulse whose amplitude is proportional to the blade surface temperature. Blade by blade temperatures are measured by known pulse-height analyzers which count and sort the pulses generated during each turbine revolution. In conjunction with such analyzers timed logic circuits can identify individual blades with abnormal temperatures.

Without counting and sorting the photodetector pulses, it is possible to measure average blade temperatures with photodetectors of slower response time. It is also possible to measure temperature gradients radially of individual or collected blades by disposing similar pyrometer systems in two or more stator blades at different distances radially inward from the turbine wall 1. By any of these measurements advance warning is given of an incipient failure condition of a rotor blade.

It should be understood that the present disclosure is for the purpose of illustration only and that this invention includes all modifications and equivalents which fall within the scope of the appended claims.

I claim:

1. Apparatus for measuring the surface temperature of a moving turbine blade within a turbine wall, comprising,
   a body fixed to the turbine wall and extending inwardly of the wall adjacent the path of the rotor blade, said body having light passage means extending inwardly in said body to an exit out of said body opposite the path of the rotor blade, and
   an infrared photoreceptor in said body inside said turbine wall and lens means for viewing said rotor blade through said exit and for directing infrared energy from the blade on said photoreceptor,
   said body having internal fluid channeling means adjacent said passage means, said channeling means being adapted to conduct a fluid coolant past said lens means during high temperature operation of said turbine.

2. Apparatus according to claim 1 wherein said body comprises a stator blade with said exit opening on the downstream surface of the blade.

3. Apparatus according to claim 1 wherein said photoreceptor is located within said body.

4. Apparatus according to claim 1 wherein said lens means consist of quartz or sapphire.

5. Apparatus according to claim 1 characterized by an infrared photodetector located outside said body and turbine, and an optical fibre having one end directed at said photodetector and the other end at the focus of said field lens within said stator blade, said fluid passages extending adjacent said fibre.

6. Apparatus according to claim 1 characterized by an infrared photodetector located within said body in position to receive infrared energy from said lens means.

7. Apparatus according to claim 6 wherein said lens means comprises an objective lens at said exit, a field lens at the focal plane of the objective lens and said infrared photodetector being located at the focus of said field lens.

8. Apparatus according to claim 7 wherein said lenses consist of quartz or sapphire.

9. Apparatus according to claim 1 wherein said fluid channeling means is disposed between said lens means and the upstream surface of said body.

10. A jet turbine engine comprising
    a turbine wall enclosing a combustion chamber,
    stator blades and rotor blades downstream from said combustion chamber,
    an infrared photodetector disposed externally of said turbine walls,
    a quartz optical fibre extending from said photodetector through said turbine wall to a stator blade,
    said stator blade having a first internal passage extending from said turbine wall to a radially inward portion of the stator blade, and a second internal passage extending from said blade portion to an exit opening on the downstream surface of the blade and toward the path of the leading edge of a rotor blade,
    optical means including a sapphire objective lens at said exit viewing the leading edge of said rotor blade and receiving infrared energy therefrom, a quartz field lens in the first passage at the focal plane of said objective lens, mirror means reflecting said infrared energy from said objective lens to said field lens, a photoreceptor at the focus of the field lens receiving said energy and a fluid channel extending from said turbine wall through the blade between said lenses and photoreceptor and the upstream surface of said stator blade for conducting a cooling fluid past said lenses and receptor during operation of the turbine.

11. Apparatus and to claim 10 wherein said photoreceptor comprises a light conductor and characterized by an infrared photodetector producing electrical pulses in response to infrared energy received from said light conduit.

12. Apparatus according to claim 10 wherein said photoreceptor comprises an infrared photodetector.

References Cited

UNITED STATES PATENTS

| | | | |
|---|---|---|---|
| 2,687,611 | 8/1954 | Larsen | 60—39.28 T |
| 2,709,367 | 5/1955 | Bohnet | 73—355 |
| 3,452,598 | 7/1969 | Jones | 73—355 |
| 3,472,497 | 10/1969 | Preszler | 73—35 UX |

FOREIGN PATENTS

| | | | |
|---|---|---|---|
| 683,391 | 11/1952 | Great Britain | 60—39.28 T |

LOUIS R. PRINCE, Primary Examiner

F. SHOON, Assistant Examiner

U.S. Cl. X.R.

60—39.28 R; 73—346, 351, 355 R; 356—44